US009922628B1

(12) United States Patent
Cole (10) Patent No.: US 9,922,628 B1
(45) Date of Patent: Mar. 20, 2018

(54) VIBRAPHONE FAN DRIVE MECHANISM

(71) Applicant: Stephen J. Cole, Arcata, CA (US)

(72) Inventor: Stephen J. Cole, Arcata, CA (US)

(73) Assignee: Marimba One Inc., Arcata, CA (US)

( * ) Notice: Subject to any disclaimer, the term of this patent is extended or adjusted under 35 U.S.C. 154(b) by 0 days.

(21) Appl. No.: 15/591,464

(22) Filed: May 10, 2017

(51) Int. Cl.
*G10D 13/08* (2006.01)
*H02K 11/21* (2016.01)
*H02K 7/14* (2006.01)
*H02P 3/02* (2006.01)

(52) U.S. Cl.
CPC ............. *G10D 13/08* (2013.01); *H02K 7/14* (2013.01); *H02K 11/21* (2016.01); *H02P 3/025* (2013.01)

(58) Field of Classification Search
None
See application file for complete search history.

(56) References Cited

U.S. PATENT DOCUMENTS

| 1,843,533 | A | 2/1932 | Zatz |
| 3,138,986 | A | 6/1964 | Musser |
| 4,619,178 | A * | 10/1986 | Kondoh ............... G10D 13/08 84/410 |
| 6,596,932 | B2 * | 7/2003 | Adams ............... G10D 13/08 84/402 |
| 7,732,691 | B2 | 6/2010 | Stevens |
| 8,123,503 | B2 | 2/2012 | Shinshi |
| 8,525,009 | B2 | 9/2013 | Stevens |
| 2015/0069872 | A1 | 3/2015 | Zhu |

* cited by examiner

*Primary Examiner* — Robert W Horn
(74) *Attorney, Agent, or Firm* — David Pressman (57) ABSTRACT

A vibrato assembly for a keyboard percussion instrument comprises a motor and a vibrato fan or disc assembly. A motor (510) is responsive to a controller (1000), a run/stop switch (1035), and a potentiometer (1020). Pulleys (100A, 100B', 515) and a timing belt (520) couple rotation of the motor to an assembly of resonator or vibrato fans (720) via one or more magnets (120) or magnetically susceptible members to isolate vibrations. A sensor is activated by one of the magnets to sense the rotational position of a pulley when the fans are oriented vertically. When a run/stop switch 1035 is in a "stop" condition, sensor 525 signals controller 1000 to stop the motor, thereby leaving the fans vertical so that resonant tubes (725) are in an open condition when the vibrato function is stopped.

20 Claims, 8 Drawing Sheets

VIBRAPHONE FAN DRIVE MECHANISM

BACKGROUND—PRIOR ART

A keyboard percussion instrument (KPI) such as a marimba or vibraphone comprises a plurality of keys that are held in a frame. The keys are usually arranged in two parallel rows that are oriented so that a user can reach all keys. The row nearest the user generally contains natural note keys, e.g., A, B, C, etc. while the more distant row contains flats and sharps or accidental keys, so-named because sharp and flat signs alter a note and thereby take it outside the usual course of events. A user wields at least one mallet, striking various keys to produce musical sounds. When struck, each key produces a fundamental frequency and various harmonic overtones that depend on the length of the key.

A corresponding set of tube resonators are located beneath the respective keys to enhance the sound produced when a key is struck. Each tube contains, in its top end (adjacent its respective key) a respective fan, generally a flat disk with diameter slightly less than the inner diameter of its tube resonator. The discs are mounted on a rod which is driven by a fan motor so that each disc rotates about a line contained within the plane of the disk. As each disc rotates (e.g., at 60 to 720 rpm), it alternately occludes or opens its respective tube and thereby produces a vibrato effect when its key is struck. The vibrato effect can be turned on by rotating—and off by stopping—the fan motor. Normally, the discs corresponding to the natural keys share a first rotating shaft and the discs corresponding to the accidental keys share a second rotating shaft, with both shafts rotating at the same rate.

In order for maximum sound to be produced when a key is struck while the vibrato effect is off, the fan must not block its tube. I.e., the plane of a stopped fan must be vertical or perpendicular to the axis of its tube. Heretofore various arrangements were provided to cause all discs to stop in the vertical position when the fan motor and hence the vibrato effect was turned off, but such arrangements were unreliable, awkward, and/or costly. Also I have found that vibrations from the fan motor were coupled to the fans and hence the resonators when the vibrato effect was turned on, so that the key sounds were polluted and not as pristine as possible.

The following is a discussion of some prior-art references that are believed to be pertinent. Patent references are listed in order of their issue date, indicated in parentheses.

Gladstone, in U.S. Pat. No. 1,843,553 B1 (Feb. 2, 1930), shows an early vibraphone with fan vibrato. The fans are placed in the upper ends of the resonator tubes and are called pulsators. When the operator presses a pedal, it removes a damping member from the tone bar and energizes the pulsator, causing it to rotate.

Musser, in U.S. Pat. No. 3,138,986 B1 (Jun. 30, 1964), shows a single motor that is used drive two fan shafts using one or two round belts (O Rings). This drive is quiet and rotates each shaft. However the two shafts are not kept in sync with one another. This is a problem because if one shaft is stopped with the fans in a vertical position, there is no guarantee that the other shaft will stop with the fans vertical. Having the fans vertical when the shafts are stopped is important because if the fans are horizontal, there is no sound energy transferred from the tone bars into the resonators and the sound of the instrument is muffled. Players are forced to physically rotate the fans separately to place the fans in a vertical position.

Kondoh, in U.S. Pat. No. 4,619,178 B1 (Oct. 28, 1986), shows a stop angle controller for a vibrato mechanism for a vibraphone. A circuit stops the fans at a predetermined stop angle to assure uniform non-vibrato performance.

Adams, in U.S. Pat. No. 6,596,932 B2 (Jul. 22, 2003), has a slip drive which allows the fans to be stopped when rotating without damage to the driving mechanism or the user. There is no timing belt or the ability to stop the fans on both shafts in a vertical position. Further, in order for the shafts to turn, they must be physically coupled to the driving mechanism, which means that any vibration in the driving mechanism will be transferred to the shafts. The resonators (including the fan shafts) may be removed from the rest of the instrument by pulling the slip coupling apart.

Stevens, in U.S. Pat. No. 7,732,691 B2 (Jun. 8, 2010) and U.S. Pat. No. 8,076,561 B2 (Dec. 13, 2011), shows a vibraphone where the resonator tubes with rotating fans have tube covers which can be adjusted for the amount they cover the tube openings, thereby to adjust the vibrato effect.

Shinshi, in U.S. Pat. No. 8,123,503 B2 (Feb. 28, 2012), shows the use of a permanent magnet (PM) coupling for driving a centrifugal blood pump. This is done for ease of parts replacement, simplification, low heat generation, etc.

Stevens, in U.S. Pat. No. 8,525,009 B2 (Sep. 3, 2013), shows a vibraphone with multi-function pedals having two ranges of motion. The first range controls damping and the second range controls the vibrato fans.

Zhu, in published U.S. patent application 2015/0069872 A1 (Mar. 12, 2015), shows a permanent magnet coupling with a variable gap between a cavity magnetic rotor and a disc rotor in the cavity so that the degree of coupling can be varied.

None of these references address or solve the aforenoted problems of stopping the discs in a vertical position when the vibrato function of such instruments is stopped and preventing coupling of the motor's vibrations to the resonators vertical position when the fan motor and hence the vibrato effect is turned on.

SUMMARY

I have discovered a method and apparatus that provides a vibration-free rotary driving force for fans in a keyboard percussion instrument (KPI) and that stops rotation of the discs in a predetermined vertical position when the vibrato function is stopped. A plurality of discs are positioned within resonating tubes beneath keys on a KPI, such as a vibraphone, in well-known fashion. When the vibrato function is engaged, the discs rotate and an electronic device senses when the discs are near-vertical and emits an electrical signal in response to this sensing with each rotation of a shaft. Two electrical switches are connected in parallel and are used to activate and deactivate the vibrato function. A first switch is manually operated by a user, i.e., a musician who plays the instrument. The first switch has two positions: ON and OFF. A second switch senses when the position of the discs in the instrument is near-vertical. In one aspect, the second switch opens when the discs are near-vertical and is closed at all other times. When it is desired to activate the vibrato function, a user activates the first switch, placing it in its ON position and thereby activating a motor drive that urges the discs to rotate. When it is desired to deactivate the vibrato function and stop the discs, the user places the first switch in its OFF position. The second switch may still be closed, causing the motor to continue to rotate until the second switch senses that the position of the discs is near-vertical. When the position of the discs is near-vertical, the second switch opens and electric power to the motor is interrupted, causing the motor to stop, thereby leaving the discs in their near-vertical position.

ABBREVIATIONS AND REFERENCE NUMERALS

KPI Keyboard Percussion Instrument
105 Hub
110 Hole
115 Teeth
120 Magnet
125 Fastener
300 Magnetic field lines
500 Bushing
505 Shaft
510 Motor
512 Conductors
515 Pulley
520 Belt
525 Sensor
527 Conductors
530 Instrument frame
700 Shaft
710 Bushing
715 Bushing
720 Disc or Fan
725 Resonant tube
730 Key
735 Key support
1000 Motor controller
1005 Power source
1007 Switch
1010 Conductors
1015 Motor terminals
1020 Potentiometer
1025 Speed adjustment terminal
1027 Internal potentiometer
1030 Conductors
1035 Run/Stop switch
1040 Acceleration control
1045 Deceleration control
1050 Run/Stop terminals
1100-1340 Flow chart blocks

DESCRIPTION—KPI WITH MAGNETICALLY COUPLED MOTOR-DRIVEN VIBRATO FANS

The present system employs a magnetic coupling to transmit rotational power from a motor to a set of KPI resonator (vibrato) fans or discs, to be described later. The coupling comprises a plurality of pulleys in which a driving pulley is magnetically coupled to a driven pulley. The driving and driven pulleys each contain a magnet or magnetically-susceptible material, such as iron, so that the driving pulley rotates, a magnetic field coupling between the two pulleys causes the driven pulley to rotate in synchrony with the driving pulley.

Magnetic Coupling Components—FIGS. 1A through 4

Figure 1A:
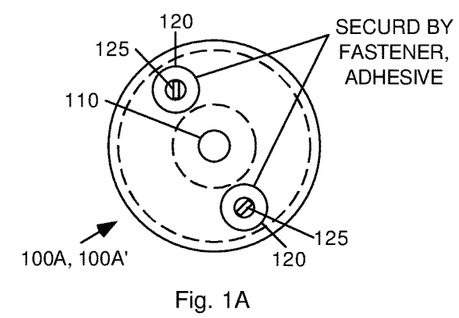
FIGS. 1A and 1B are front and side views, respectively, of a first pulley used in the vibrato system according to one aspect of one embodiment.
Figure 1B:
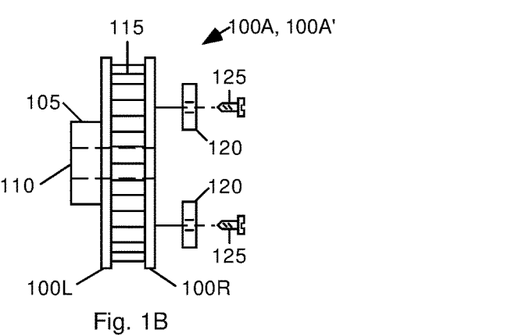

FIGS. 1A and 1B are front and side views, respectively, of a pulley assembly 100A that forms a first half or side of a first magnetic coupling for one embodiment of a KPI with resonators and a controllable vibrato function. Pulley assembly 100A comprises a wheel with two circular outside flanges 100L and 100R that sandwich a short cylinder having a set of teeth 115 that are sized to mesh with a matching timing belt (not shown in this view). The pulley assembly includes a hub 105 and a central hole 110 for securing the pulley assembly to a shaft (not shown in this view).

One or more magnets 120 are secured to right flange 100R of pulley assembly 100A by fasteners 125 or adhesive (not shown), or both. In one aspect, magnets 120 are toroidal in shape and easily accommodate fasteners (preferably screws) 125; however magnets 120 can also be disks that are secured to pulley 100A by adhesives.

Figure 2A:
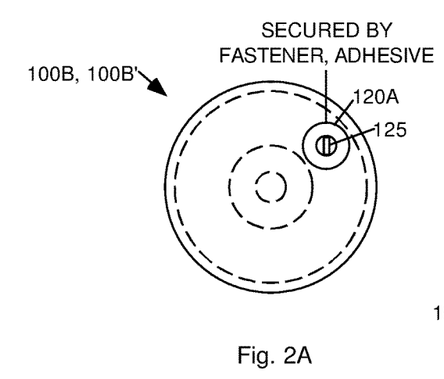
FIGS. 2A and 2B are front and side views, respectively, of a second pulley used in the vibrato system according to one aspect of the embodiment.
Figure 2B:
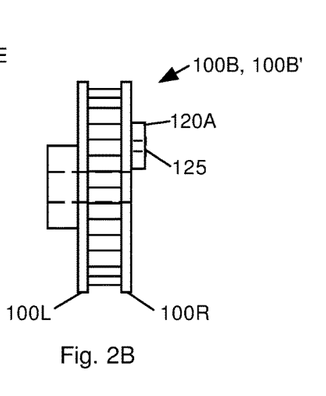

FIGS. 2A and 2B are front and side views, respectively, of a second pulley assembly 100B that forms a first half or side of a second magnetic coupling. Pulley assembly 100B is similar to pulley assembly 100A except that only one magnet 120 is used. As above, magnet 120 is secured to the outside of pulley assembly 100B by a fastener 125 or adhesive (not shown in this view), or both.

Figure 3A:
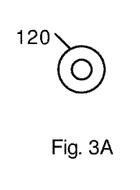
FIGS. 3A and 3B are top and side views of a magnet used in one aspect of the vibrato system.
Figure 3B:
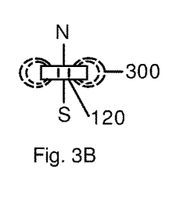

FIGS. 3A and 3B are top and side views of a single toroidal magnet 120. A plurality of magnetic field lines 300 are shown in FIG. 3B to indicate the presence of a magnetic field that is associated with magnet 120.

Figure 4:
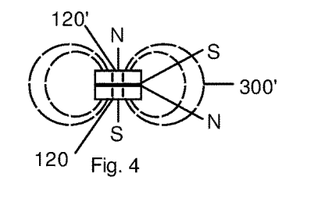
FIG. 4 shows the combining of two magnets used in the vibrato system to increase magnetic field strength.

FIG. 4 is a side view showing a plurality of magnets 120, 120' that are joined together in a north-south-north-south (N-S-N-S) fashion. Joining magnets together in this fashion increases the magnetic field strength of the combination over that of a single magnet, as indicated by magnetic field lines 300'. This is useful when a coupling must supply more torque than is achievable with a single magnet in each pulley assembly.

Pulleys 100 are sourced from McMaster-Carr Company in Santa Fe Springs, Calif., USA, and carry part number 1254N37. Pulleys 100 are made of a non-magnetic material such as plastic or aluminum. Magnets 120 are sourced from K and J Magnetics, of Plumsteadville, Pa., USA, and are identified by part number R822CS-N or R822CS-S.

Figure 5:
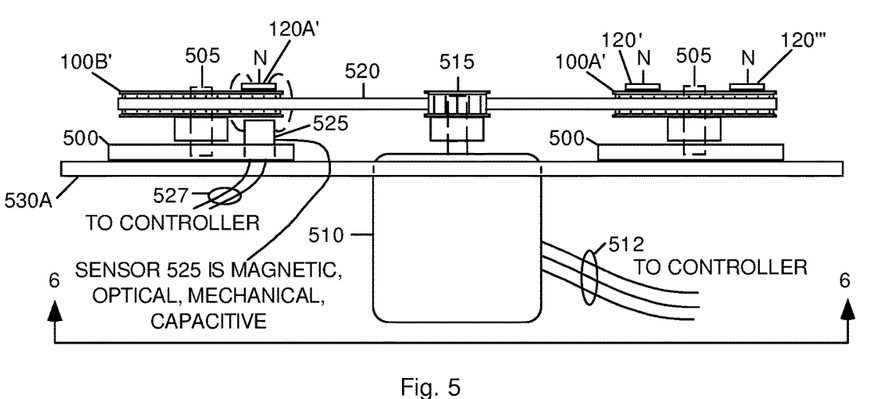
FIG. 5 is a top view showing the arrangement of certain parts of a motor drive used in the vibrato system according to one aspect.
Figure 6:
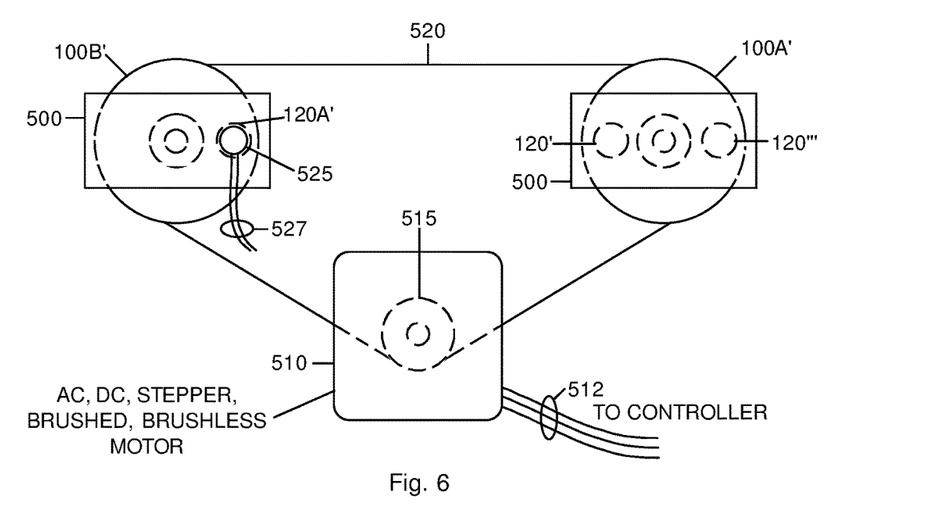
FIG. 6 is a frontal view showing arrangement of the parts in FIG. 5 as they are found in a KPI.

Motor Drive Assembly—FIGS. 5 and 6

FIGS. 5 and 6 are top and side views, respectively, of a motor drive assembly that is used to drive the KPI resonator fans or discs according to one aspect. Pulley assemblies 100A and 100B are rotatably secured to bushings 500 by shafts 505. In one aspect, shafts 505 are press-fit into pulley assemblies 100A and 100B and rotate freely in bushings 500. In an alternative aspect, pulley assemblies 100A and 100B rotate freely on shafts 505 and shafts 505 are fixedly secured in bushings 500. Bushings 500 are secured to a frame portion 530A of the KPI.

A motor 510 drives a toothed pulley 515 that is similar to pulleys 100A and 100B. Pulley 515 is generally, although not necessarily, smaller than pulleys 100A and 100B. If pulleys 100A and 100B each have 60 teeth, pulley 520 can have 20 teeth, for example, for a rotational speed reduction by a factor of 3 between the motor shaft and the fan shafts. The teeth in all three pulleys are the same size. Motor 510 is also secured to frame portion 530A of the KPI.

A toothed belt 520 rotatably joins pulley assemblies 100A, 100B, and 515. The teeth in belt 510 match and mate with the teeth in pulleys 100A, 100B, and 515. This ensures that pulley assemblies 100A and 100B are locked in angular synchrony, i.e., the belt cannot slip with respect to the pulleys. When motor 510 is activated by a controller (described below) via leads 512, pulley 515 belt 510 to translate, which in turn urges pulley assemblies 100A and 100B to rotate.

The motor drive assembly further includes a sensor 525. Sensor 525 is magnetically sensitive so that it detects the presence of magnet 120A as pulley assembly 100B rotates. When pulley assembly 100B is rotatably positioned so that magnet 120A is opposite sensor 525, sensor 525 detects the proximity of magnet 120A and in response issues an electrical signal to a controller (described below) via electrical leads 527. Sensor 525 can alternatively be an optical sensor, a capacitive sensor, or a mechanical sensor.

Although a single magnet 120 is shown attached to pulley 100B, two magnets can be used, depending on the strength of the magnets and the diameters of pulley 100A and 100B.

Sensor 525 is sold as part number CH410 from ZF Electronic Systems LLC, of Pleasant Prairie, Wis., USA. Pulley 515 is model 20MP025MIA6, sold by B and B Manufacturing of La Porte, Ind., USA. Motor 510 is model 21K64A-AW2U AC motor from Oriental Motor Company of Japan. Motor 510 is controlled by a motor controller (discussed below), such as model ES01 or ES02, also made by Oriental Motor Company. DC, brushed, brushless, and stepper motors with similarly appropriate controllers can be substituted for the AC motor.

Figure 7:
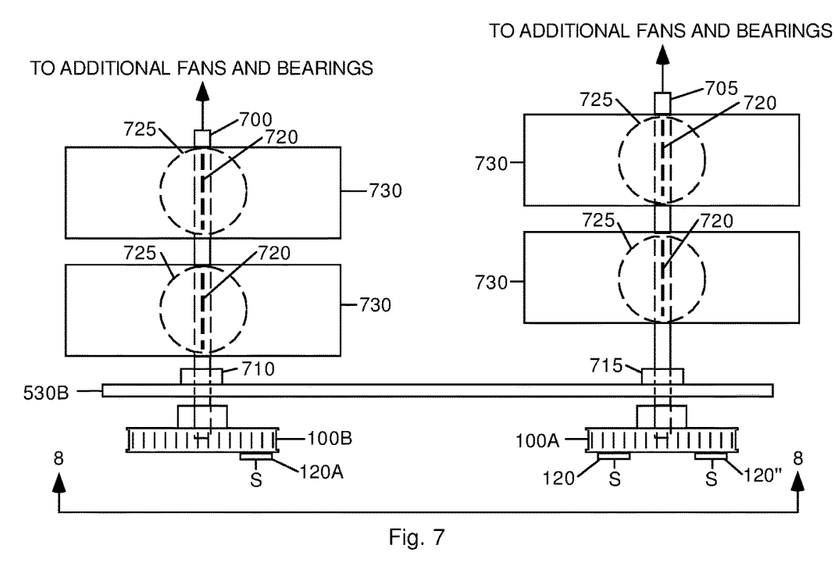
FIG. 7 is a top view showing the arrangement of certain parts in a KPI, including driven discs shafts that are urged to rotate when coupled with the motor drive of FIG. 5.
Figure 8:
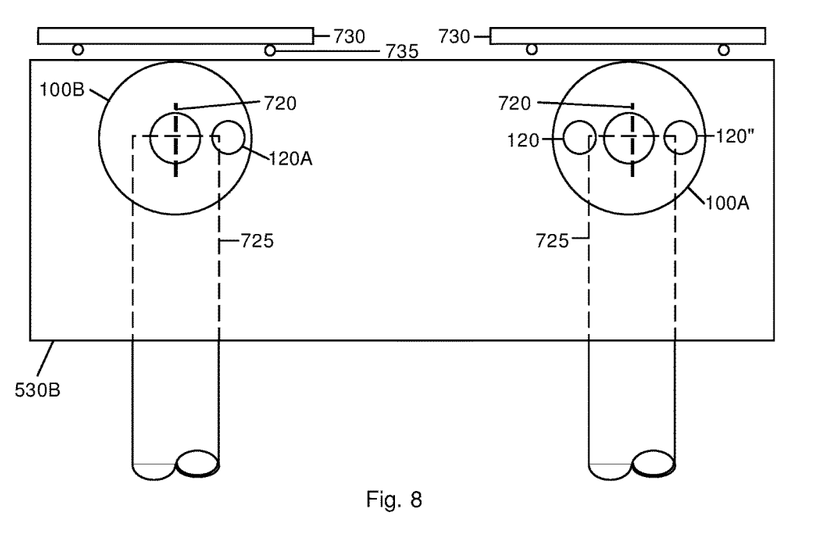
FIG. 8 is a front view showing an arrangement of the parts of FIG. 7 as they are found in a KPI.

Driven Fan or Disc Assembly—FIGS. 7 and 8.

FIGS. 7 and 8 are top and side views, respectively, of a driven fan or disc assembly in a KPI (not shown but shown in some of the referenced cited supra, such as Gladstone). The driven disc assembly comprises pulley assemblies 100A and 100B, magnets 120 and 120A, and shafts 700 and 705. Shafts 700 and 705 are rotatably supported in bearings or bushings 710 and 715 that are secured to frame member 530B of the KPI. Shafts 700 and 705 support a plurality of fans or discs 720 that rotate within the top portions of resonating tubes 725 that lie beneath keys 730, in well-known fashion. Shafts 700 and 705 extend through apertures at the tops of tubes 725 in well-known fashion. FIG. 8 shows a plurality of well-known key supports 735. Note that in the top view of FIG. 7, as well as the side view of FIG. 8, the rotation fans or discs are shown when they are in a vertical orientation by heavy broken lines. In FIG. 7, the circular broken lines show the fans or discs when they are in a horizontal orientation. The row of keys on the left side of FIGS. 7 and 8 are the accidental keys, which, in well-known fashion are offset from the keys in the natural row on the right side of these Figs. (Only two keys of each row are shown in FIG. 7 and the natural and accidental key row designations can be reversed.)

Figure 9:
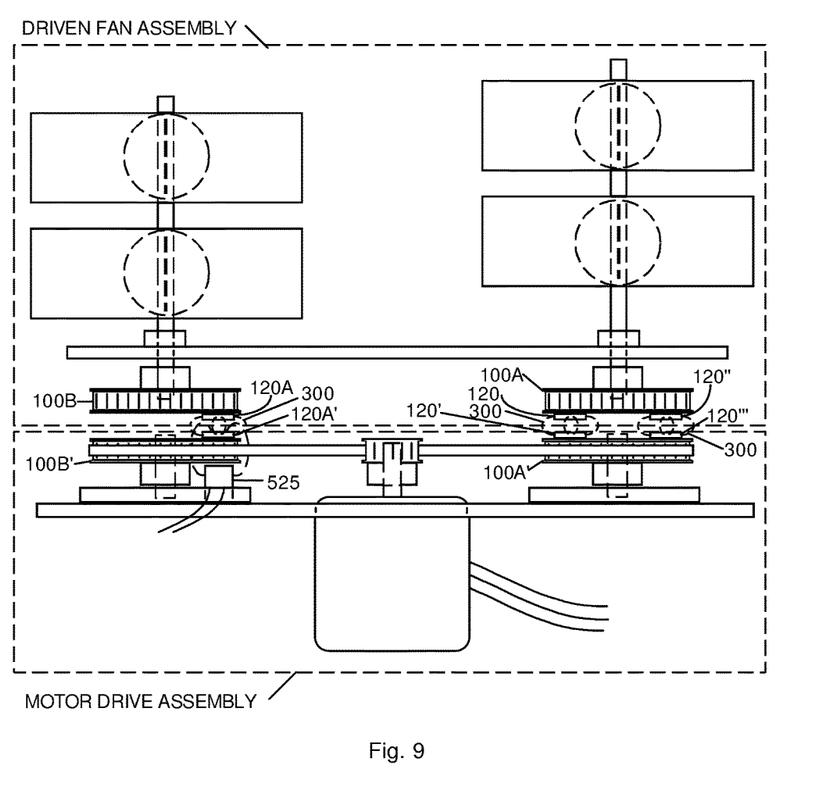
FIG. 9 is a top view showing positioning of the parts in FIGS. 5 through 8 as they are arranged for use in a KPI.

Combining the Motor Drive Assembly and the Driven Fan Assembly—FIG. 9.

FIG. 9 is a top view showing the driving and driven assemblies positioned for use. Pulley assembly 100B' in the motor drive assembly is aligned on centers with pulley assembly 100B in the driven disc assembly. Pulley assembly 100A' in the motor drive assembly is aligned on centers with pulley assembly 100A in the driven fan assembly.

Magnets 120A and 120A' are attracted to one-another as indicated by magnetic field lines 300. Magnetic field lines 300 also extend to sensor 525 when sensor 525 is aligned with magnet 120A'. When sensor 525 and magnet 120A' are aligned, sensor 525 is activated; when they are not aligned, sensor 525 is not activated. During assembly of the driven disc assembly, discs 720 are set at their vertical position when magnet 120A' is at its closest position to sensor 525.

Magnets 120 and 120' are attracted to one-another and magnets 120" and 120'" are attracted to one-another, as indicated by magnetic field lines 300.

The driven disc assembly and motor drive assembly are positioned so that the spacing between magnets 120A and 120A', 120 and 120', and 120" and 120'" is between 1 and 5 mm, although other spacings can be used, depending on magnet strength, physical space limitations, and the like.

In FIG. 5, the polarities of magnets 120A', 120', and 120'" are shown as N (North pole) facing upward. In FIG. 7, the polarities of magnets 120A, 120, and 120" are shown as S (South pole) facing downward. When the driven fan assembly and the motor drive assembly are positioned for use, these N and S orientations produce maximum attraction between pulleys 100B and 100B' and 100A and 100A'. This results in maximum torque transfer between the driven disc assembly and the motor drive assembly. Of course, these magnet orientations can be reversed with no change in torque transfer.

Figure 10:
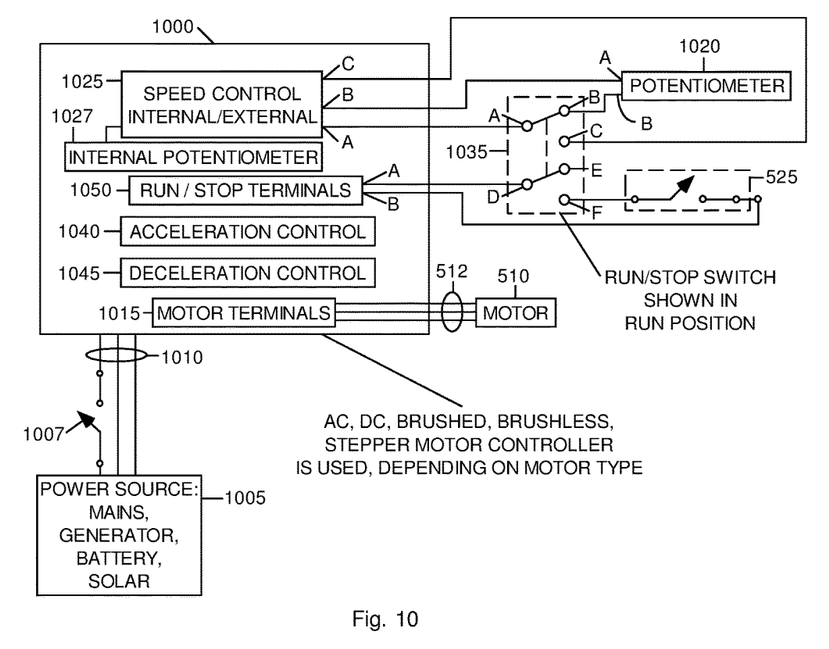
FIG. 10 is a schematic block diagram of external controls and a motor controller according to an aspect.

Motor Controller—FIG. 10

FIG. 10 is a schematic diagram showing a motor controller 1000 having various internal and external controls and connections for receiving electrical inputs in order to control the performance of motor 510 (FIG. 5). Controller 1000 operates under user control, as depicted by the flow chart of FIG. 11 and the accompanying explanation. A power source 1005 provides operational energy to controller 1000 via an on/off switch 1007 and a plurality of conductors 1010.

Motor 510 receives operating current from controller 1000 via a plurality of conductors 512 that are connected to motor terminals 1015 within controller 1000.

A double-pole, double-throw (DPDT) switch 1035 provides connections to external circuit elements in order to control the operation of motor 510. Terminals 1035-A and 1035-D of switch 1035 are not electrically connected, but their poles (the connecting lines between terminals A and B, and between terminals D and E) are mechanically connected. I.e., when terminals 1035-A and 1035-B are connected together, so are terminals 1035-D and 1035-E. This is the RUN position of switch 1035 which instructs controller 1000 to assume a RUN condition and urge motor 510 and both sets of fans (FIGS. 7 to 9) to rotate so as to open and close the tops of the resonator tubes and thereby produce a vibrato effect whenever any key is struck.

When switch 1035 is moved to the STOP position, i.e., when it is desired to stop the rotation of motor 510 and both sets of discs (FIGS. 7 to 9) so as to eliminate the vibrato effect, controller 1000 is put into a STOP condition, connecting terminal 1035-A to terminal 1035-C and terminal 1035-D to terminal 1035-F.

A speed control 1025 within controller 1000 has three terminals, 1025-A, 1025-B, and 1025-C, that are accessible to external circuitry. When terminals 1025-A and 1025-C of speed control 1025 are connected together, a manually adjustable (i.e., with a screwdriver or other tool) potentiometer 1027 that is connected internally within controller 1000 determines the rotational speed of motor 510. This done when switch 1035 is in the STOP position, i.e., terminals 1025-A and 1025-C are connected together via terminals 1035-D and 1035-F.

An external potentiometer 1020 is used when an alternative motor speed setting is desired. This is done when switch 1035 is in the RUN position, as shown. In this case, terminals 1020-A and 1020-B of potentiometer 1020 are connected to terminals 1025-A and 1025-C of speed control 1025 via terminals 1035-A and 1035-B of switch 1035. Thus when switch 1035 is in the RUN position, the speed of motor 510 is determined by the electrical resistance of potentiometer 1020 and when switch 1035 is in the STOP position, the speed of motor 510 is determined by manual adjustment of internal potentiometer 1027 within controller 1000. When switch 1035 is in the RUN position, the speed of motor 510 determines the vibrato frequency of the KPI. When switch 1035 is in the STOP position, the speed of motor 510 is set to a predetermined level that enables stopping of the vibrato function with fans 720 in a vertical position, as described below. Potentiometer 1020 is rotary, touch, digital, or slide style, located on the top, front, or side of the KPI within easy reach of a user.

Controller 1000 includes a run/stop function that is actuated when run/stop terminals 1050-A and 1050-B are connected together. When these terminals are connected together while motor 510 rotates, controller 1000 brings motor 510 to a stop at a rate determined by a deceleration control 1045. Deceleration control 1045 is manually adjustable using a potentiometer (not shown) in controller 1000. When a connection between terminals 1050-A and 1050-B is opened and motor 510 is actuated, motor 510 accelerates to a predetermined speed at a rate determined by a manually adjustable acceleration control 1040 within controller 1000. The setting of the acceleration and deceleration rates is described below.

Run/stop switch 1035 is connected in series with a sensor 525 when switch 1035 is in the STOP position. In the present aspect, sensor 525 is a magnetically actuated switch that closes when it receives a magnetic field from magnet 120A' (FIG. 5) and is open at all other times. Sensor 525 and terminals 1035-D and 1035-F of switch 1035 are connected in series to run/stop terminals 1050-A and 1050-B within controller 1000. When the circuit comprising switch 1035 and sensor 525 is open, controller 1000 activates motor 510, causing it to turn at a rate determined by the setting of speed adjustment 1025. When both switch 1035 and sensor 525 are closed, the associated circuit is closed and controller 1000 urges motor 510 to stop, or to remain stopped. Switch 1035 is a toggle, rocker, touch-activated, or slide switch, located on the top, front, or side of a KPI within easy reach of a user.

Another type of motor controller, i.e., one for use with a DC or stepper motor, etc., may energize the connected motor when the controller's run/stop terminals experience a closed circuit and de-energize a motor when its run/stop terminals experience an open circuit. In this case, run/stop switch 1035 and sensor 525 would be connected in parallel instead of in series.

Figure 11:
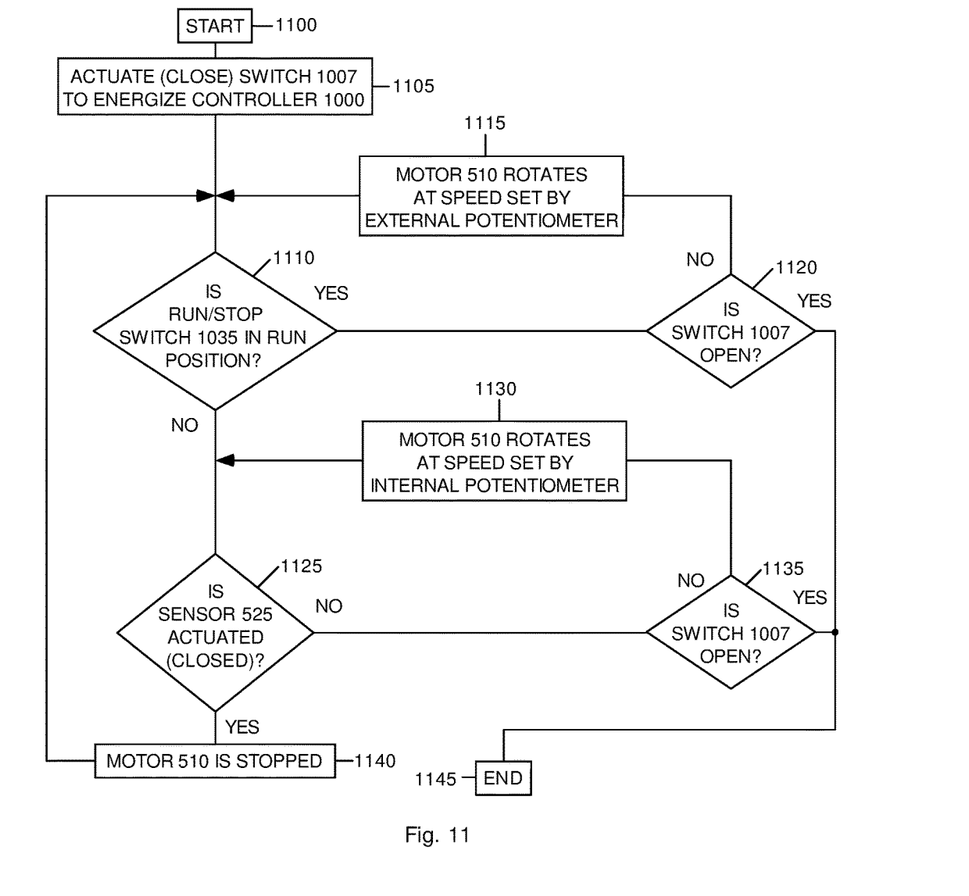
FIG. 11 is a flow chart showing operation of the embodiment.

First Embodiment—Operation—FIG. 11

FIG. 11 is a flow chart showing one aspect of the operation of the KPI. At the start (block 1100), switch 1007 (FIG. 10) is open, power source 1005 is active, and controller 1000 is not energized. Thus the motor is off and the vibrato fans or discs are not rotating so there is no vibrato effect. In addition, the position of fans 720 is not known a priori when the KPI is first installed. To ensure that discs 720 are in a vertical position, a run/stop cycle must be performed, as described below.

When controller 1000 is energized, the operation of controller 1000 is determined by the on/off conditions of sensor 525 and switch 1035, the resistances of external and internal potentiometers 1020 and 1027, respectively, and acceleration and deceleration controls 1040 and 1045, respectively. To energize controller 1000, a user (not shown) closes switch 1007 (block 1105).

To run the discs and produce vibrato, run/stop switch 1035 is put in the run position (block 1110) and switch 1007 is not open (block 1120), so that motor 510 and the vibrato discs rotate, producing vibrato. The frequency of the vibrato is set by external potentiometer 1020 (block 1115), which adjusts the speed of the motor. This is the start of a run/stop cycle.

The magnetic coupling will transmit rotational power from the motor to the vibrato fans or discs to turn them at the desired rotational speed, but the magnetic coupling will not be able to transmit higher-frequency deleterious vibrations of the motor to the discs or the rest of the system, resulting in a more pristine vibraphone sound.

If switch 1007 is opened at this point (block 1120), the current run/stop cycle is terminated, controller 1000 is no longer energized, motor 520 coasts to a stop, and the logic process is at an end (block 1145). At this point, the rotational position of discs 720 is indeterminate since a full run/stop sequence has not yet been executed.

If motor 510 was previously running (block 1115) and then run/stop switch 1035 is actuated so that it is not in its run position (block 1110) and if sensor 525 is not actuated, i.e., not closed by the presence of magnet 120A' (block 1125), and switch 1007 is not open (block 1135), then motor 510 rotates at a speed set by internal potentiometer 1027 (block 1125). In the current embodiment, the speed set by internal potentiometer 1027 is slower than the speed set by external potentiometer 1020 for reasons that are explained below. The rate of deceleration from the higher speed to the lower speed is determined by the setting of deceleration control 1045, as discussed below. In practice, internal potentiometer 1027 is set at or near its minimum value, so that the speed of motor 510 is at or near its minimum setting under this condition.

If motor 510 was previously running at a speed set by internal potentiometer 1027 and then switch 1007 is actuated so that it is open (block 1135), then the current run/stop cycle is terminated, controller 1000 and hence the motor is no longer energized, and the logic process ends (block 1145). At this point, the rotational position of discs 720 is still indeterminate because a full run/stop sequence has not been executed.

If motor 510 was previously running (block 1115) and then run/stop switch 1035 is actuated so that it is not in its run position (block 1110) and if sensor 525 is actuated, i.e., closed by the presence of magnet 120A' (block 1125), and switch 1007 is not open (block 1135), then run/stop terminals 1050 of controller 1000 are shorted together and motor 510 stops at a rate set by deceleration control 1045. At this point, the current run/stop cycle is complete. Discs 720 are stopped in a vertical position because motor 510 has been stopped while magnet 120A' is adjacent sensor 525. Thus the vibrato effect is stopped and resonating tubes 725 are fully functional.

Note that magnet 120A' performs two functions: it couples rotational energy from pulley 100B' to pulley 100B without vibration and it also activates sensor 525 when magnet 120A' and sensor 525 are adjacent one-another.

In use, external potentiometer 1020 is set to any desired vibrato speed, limited only by the high and low speed limits of motor 510 and the relative diameters of pulleys 100A, 100B and 515 (FIG. 6). Pulleys 100A and 100B are normally the same diameter, although other diameters can be used. For the STOP condition, internal potentiometer 1027 is normally set for a slow speed, on the order of a few revolutions per minute, in order that controller 1000 can stop motor 510 as soon as sensor 525 detects the presence of magnet 120A'. This assures that discs 720 (FIG. 7) are stopped in their vertical position.

Figure 12:
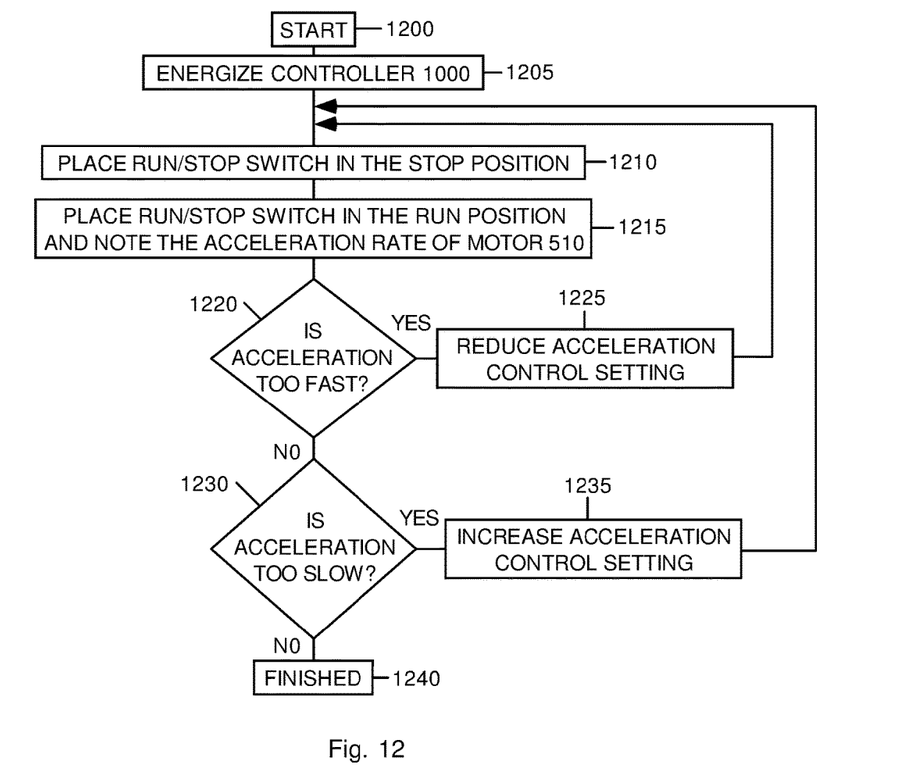
FIG. 12 is a flow chart showing a first adjustment of the embodiment.
Figure 13:
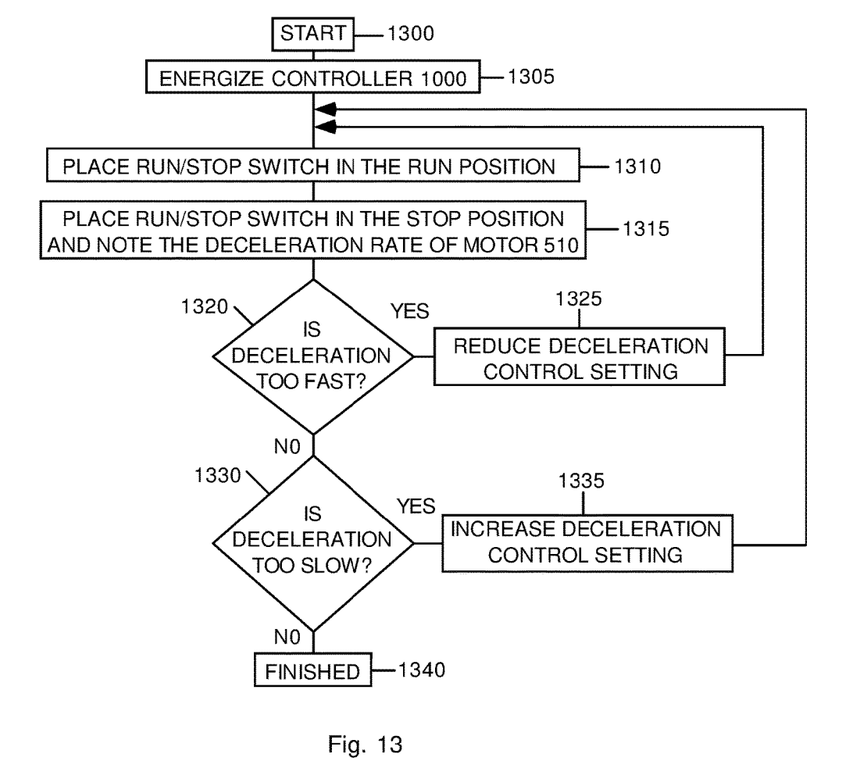
FIG. 13 is a flow chart showing a second adjustment of the embodiment.

First Embodiment—Adjustments—FIGS. 12 and 13

FIGS. 12 and 13 are flowcharts showing the steps in setting acceleration and deceleration controls 1040 and 1045, respectively, of controller 1000. Controls 1040 and 1045 are initially set by the manufacturer of controller 1000. These settings may be too fast or too slow for use in a KPI because they can induce vibration if too fast. On the other hand, if deceleration of motor 510 is too slow when a user wishes to stop the vibrato sound, pulley 100B' may cause magnet 120A' to pass by sensor 525 too fast, causing motor 510 to continue turning when, in fact, it should stop. Optimum settings for controls 1040 and 1045 are determined empirically.

FIG. 12 is a flowchart that shows a process for setting acceleration control 1040. At the start (block 1200) controller 1000 is energized (block 1205) by a user. Run/stop switch 1035 is placed in the stop position. Next, run/stop switch 1035 is placed in the run position (block 1215) and acceleration of discs 720 is noted (block 1220). If acceleration is too fast, the inertia of pulley 100B and its rotary attachments, i.e., discs 720 and shafts 700, may cause the magnetic coupling between magnet 120A' and 120A to be lost. In this case, a user reduces acceleration control setting 1040 (block 1225). Next, the user places run/stop switch 1035 in the stop position (1210) and repeats the steps in blocks 1210, 1215, 1220, and 1225 until the desired acceleration is obtained. On the other hand, if acceleration is not too fast (block 1220), but is too slow (block 1230), the vibrato effect may start too slowly when it is energized, thereby having a deleterious effect on music being performed. In this case, a user increases acceleration control setting 1040 (block 1235) and repeats the steps in blocks 1210, 1215, 1220, 1230, and 1235 until the desired acceleration is obtained. At this point, adjustment of acceleration control 1040 is finished (block 1240). In practice, acceleration control 1040 is set to its minimum value, i.e., when so activated, controller 1000 urges motor 510 to reach its full speed without delay.

FIG. 13 is a flowchart that shows a process for setting deceleration control 1045. At the start, (block 1300) a user energizes controller 1000 (block 1305) and places run/stop switch 1035 in the run position (block 1310). When motor 510 reaches a speed determined by the setting of potentiometer 1020, the user places switch 1035 in the stop position (block 1315) and notes the rate of deceleration of motor 510 and discs 720 to the new speed set by internal potentiometer 1027 (block 1320). If the rate of deceleration is too fast, it is possible that the magnetic coupling between magnets 120A' and 120A would be lost, leaving discs 720 in an indeterminate position. In this case, the user reduces the setting of deceleration control 1045 (block 1325). Steps 1310, 1315, 1320, and 1325 are repeated until the rate of deceleration is at a desired level. On the other hand, if deceleration is initially too slow (block 1330), the vibrato effect may continue too long, thereby having a deleterious effect on music being performed. In this case, the setting of deceleration control 1045 is increased (block 1335). Steps 1305 through 1335 are repeated until the desired rate of deceleration is reached. At this point, the adjustment procedure is finished (block 1340). In practice, deceleration control 1045 is set to its minimum value, i.e., when so activated, controller 1000 urges motor 510 to stop without delay.

CONCLUSION, RAMIFICATIONS AND SCOPE

I have devised an improved method and mechanism for operating vibrato-inducing discs or fans in a KPI so that their motor does not induce deleterious vibrations and so that the when the discs or fans are stopped, they come to rest in a vertical position so as not to impede the coupling between the keys and their tube resonators. The magnetic coupling between the driving source and the rotatable shafts prevents the vibrations of the motor from being coupled to the resonators, so that the instrument produces a more pristine sound. The rotary source comprises a motor and a motor controller that is activated and deactivated by a user. The motor controller has an adjustable speed control that sets the vibrato frequency. The motor controller also includes a "stop" function that causes the motor to decelerate to a stop at a predetermined rate. A run/stop switch and a sensor are connected in series and act in concert to activate the stop function. The sensor senses when the discs are oriented vertically, i.e., not blocking resonant tubes beneath keys on the instrument and forms a closed circuit between its terminals. When both the sensor and the run/stop switch are in a closed condition, the motor controller stops rotation of the discs when they are vertical. The magnet that couples the motor drive assembly and the driven disc assembly performs two distinct functions: it couples rotary motion from the motor drive assembly to the driven disc assembly and it also activates a sensor at a predetermined position in order to stop the discs fans when they are in a vertical position.

Instead of using a magnetic sensor to sense when discs are vertical, a capacitive, optical, or mechanical sensor can be used. Instead of using a toothed belt in the motor drive assembly, a chain or an alternative timing belt design can be used. Various belt and pulley designs are well-known to engineers skilled in the art of mechanical drive systems. Instead of being located on the top, front, or side of a KPI controls such as a switch or potentiometer can be foot-operated. Instead of using the "stop" function of a motor controller, the "brake" function can be used for an abrupt stop of the motor shaft. In cases where a motor controller causes a motor to rotate when its start/stop terminals are shorted, a normally open type of sensor is used, i.e., when the sensor detects a magnet, its terminals open a circuit. In this case, a run/stop switch is connected in parallel with the sensor and the run/stop switch positions are reversed.

Instead of using a single motor and timing belt to urge a plurality of drive pulleys to rotate in the motor drive assembly, a plurality of synchronized motors, each with positional feedback and its own drive pulley, can be used. In this case, each pulley in the motor drive assembly is driven by a motor. No timing belt is used to synchronize the drive pulleys. A suitable motor controller arrangement urges each motor to run, or to stop at a predetermined rotary position at which all fans are oriented vertically. The magnetic drive can be arranged to use a magnet on the driving (or driven) pulley and a magnetically susceptible part, i.e., not a magnet, in place of the magnet on the driven (or driving) pulley. A KPI can have more or less than two rows of keys and one or more rows can be furnished without discs. Instead of providing discs in the resonators under all the keys in a row, discs can be omitted from a portion of the resonators. Instead of magnetic couplings between all driving and driven shafts, one fan shaft can be driven with a magnetic coupling while another is driven directly with a mechanical coupling. Instead of pulleys with belt couplings, plain magnetically coupled discs may be used to couple the motor to the fan shaft(s). In any case with a single motor and plural disc shafts, means for coupling the motor's disc (plain or pulley) to drive the first and second shafts would be the arrangement of discs (plain or pulley) that couple the rotation of a single shaft to multiple shafts. Although the "brake" and "stop" functions of the controller are actuated differently, i.e., by connecting to different terminals on the motor controller, we have found experimentally that the rate of stopping of the drive motor are the same. Thus the brake function of the motor controller could be substituted for the stop function.

Instead of toroidal magnets attached to the sides of the driving and driven pulleys, bar magnets of similar size and strength can be affixed to the sides of the pulleys or inserted into the bodies of the pulleys. If required, non-magnetic counterweights of similar mass to the magnets can be used to balance a driving pulley that has only a single magnet.

Instead of switching between internal and external potentiometers when changing motor speeds, a resistive element such as a resistor or potentiometer can be substituted for the speed control potentiometer when the run/stop switch is placed in the stop position.

Thus the scope should be determined by the appended claims and their legal equivalents, rather than the examples and particulars given.

The invention claimed is:

1. A fan drive mechanism for a keyboard percussion instrument, comprising:
    a motor controller,
    a motor drive assembly, comprising:
        a motor having a motor shaft that is connected to and responsive to said motor controller when said motor controller is activated,
        a first or driving disc mounted on said motor shaft,
        a magnetically susceptible member affixed to a predetermined location on said driving disc,
    a driven fan assembly, comprising:
        a second or driven disc,
        a shaft rotatably connected to said second disc,
        a plurality of resonator fans attached to said shaft,
        said second or driven disc being parallel to and spaced from said first or driving disc and having at least one magnet thereon, said magnet being responsive to said magnetically susceptible member on said first disc so that rotation of said first disc causes said second disc to rotate,
        a sensor adjacent said second disc and arranged to detect provide a predetermined output when said magnet is adjacent to said sensor and when said plurality of resonator discs are in a predetermined rotary position, said sensor being electrically connected to said motor controller, and
        said magnet and said resonator being positioned so that when said magnet is rotationally adjacent said sensor, said fans will be in said predetermined rotary position,
    whereby when said motor in said motor drive assembly is activated, said first disc urges said second disc and said fans to rotate and said magnet provides said predetermined output when it is rotationally adjacent said sensor, whereby said controller will receive said predetermined output from said sensor each time it is adjacent said magnet and said fans are in said predetermined rotary position.

2. The fan drive mechanism of claim 1 wherein said motor controller is arranged to detect the state of an external electrical circuit such that when said circuit is open, said motor controller urges said motor to rotate, and when said circuit is closed, said motor controller urges said motor to stop rotating.

3. The fan drive mechanism of claim 1, further including a start/stop switch connected in series between said sensor and said motor controller so that when said start/stop switch is closed, said sensor signals said motor controller that said magnet is adjacent said sensor.

4. The fan drive mechanism of claim 3 wherein said motor controller is arranged so that when said controller is activated and said start/stop switch is open, said controller energizes said motor, thereby causing said first disc to rotate, causing said second disc to rotate.

5. The fan drive mechanism of claim 3 wherein while said motor controller is arranged so that when said controller is activated and said start/stop switch is closed and said sensor senses the presence of said magnet on said second disc, said start/stop switch and said sensor form a closed circuit and said controller causes said motor to stop rotating.

6. The fan drive mechanism of claim 1 wherein said motor is selected from the group consisting of alternating current, direct current, brushed, brushless, and stepper motors.

7. The fan drive mechanism of claim 1, further including a potentiometer with variable electrical resistance connected to said motor controller, said motor controller being responsive to said potentiometer so as to control the speed of rotation of said motor based on said resistance of said potentiometer.

8. The fan drive mechanism of claim 7 wherein at least one of said potentiometer and said run/stop switch are actuable by foot.

9. The fan drive mechanism of claim 1, further including a second shaft having a plurality of fans attached to said second shaft and means for coupling said first disc to drive said first and second shafts.

10. The fan drive mechanism of claim 1 wherein said magnetically susceptible member on said first disc is a magnet.

11. The fan drive mechanism of claim 10, further including a second shaft having a plurality of fans attached to said second shaft and means for coupling said first disc to drive said first and second shafts.

12. A method for driving and stopping fans at a predetermined position in a vibraphone, comprising:
   providing a motor controller,
   providing a driven fan assembly that is positioned adjacent to and is responsive to a motor drive assembly,
   providing a motor drive assembly containing a motor and a sensor, said sensor being arranged to form a closed circuit when said fans are at a vertical position,
   providing a start/stop switch electrically connected in series with said sensor, the series connection of said start/stop switch and said sensor being connected to said motor controller, said motor controller being arranged to (a) cause said motor to rotate when said start/stop switch and said sensor form an open circuit, and (b) cause said motor to stop rotating when said start/stop switch and said sensor form a closed circuit,
   energizing said motor controller,
   actuating said start/stop switch to an open condition, thereby causing said motor controller to energize said motor and cause said motor to rotate, and
   actuating said start/stop switch to a closed condition, whereby when said sensor detects said predetermined condition and said sensor forms a closed circuit, said closed circuit formed by said start/stop switch and said sensor cause said motor controller to cause said motor to stop while said motor drive assembly is in said predetermined condition.

13. The method of claim 12 wherein said sensor is selected from the group consisting of magnetic, optical, mechanical, and capacitive sensors.

14. The method of claim 12 wherein said motor is selected from the group consisting of alternating current, direct current, brushed, brushless, and stepper motors.

15. The fan drive mechanism of claim 10, further including a potentiometer with variable electrical resistance connected to said motor controller, said motor controller being responsive to said potentiometer so that said controller sets the speed of rotation of said motor based on said resistance of said potentiometer.

16. Apparatus for driving and stopping fans at a predetermined position in a vibraphone, comprising:
   a motor controller,
   a run/stop switch having predetermined run/stop conditions,
   a motor drive assembly having a motor connected to and responsive to said motor controller, said motor drive assembly further including a sensor, said run/stop switch and said sensor being connected to said motor controller, said sensor being arranged to sense a predetermined positional condition when said fans are at a vertical position,
   a driven fan assembly, said driven fan assembly being magnetically coupled to said motor drive assembly and locked in rotational synchrony therewith,
   said motor controller being arranged so that when said sensor senses said predetermined positional condition and said run/stop switch is in said predetermined stop condition, said motor controller causes said motor to stop rotating, and
   when said switch is in said run condition, said motor controller causes said motor to rotate.

17. The apparatus of claim 16 wherein said sensor is selected from the group consisting of magnetic, optical, mechanical, and capacitive sensors.

18. The apparatus of claim 16 wherein said sensor is selected from the group consisting of sensors that open an electrical circuit in response to sensing and those that close an electrical circuit in response to sensing.

19. The apparatus of claim 16 wherein said motor is selected from the group consisting of alternating current, direct current, brushed, brushless, and stepper motors.

20. The apparatus of claim 16 wherein said motor drive assembly comprises a plurality parallel spaced discs, a first of which is coupled to said magnet and a second of which is coupled to said driven fan assembly, with a magnet on one of said discs and a magnetically susceptible member on the other of said discs so that rotation of said first disc causes said second disc to rotate.

* * * * *